US009779685B2

(12) United States Patent
Ishiguro

(10) Patent No.: US 9,779,685 B2
(45) Date of Patent: Oct. 3, 2017

(54) DISPLAY CONTROL DEVICE FOR VEHICLE TO GENERATE NATIVE DISPLAY IMAGES AND VERSATILE DISPLAY IMAGES

(71) Applicant: DENSO CORPORATION, Kariya, Aichi-pref. (JP)

(72) Inventor: Hiroshi Ishiguro, Anjo (JP)

(73) Assignee: DENSO CORPORATION, Kariya (JP)

( * ) Notice: Subject to any disclaimer, the term of this patent is extended or adjusted under 35 U.S.C. 154(b) by 42 days.

(21) Appl. No.: 14/647,871

(22) PCT Filed: Dec. 12, 2013

(86) PCT No.: PCT/JP2013/007309
§ 371 (c)(1),
(2) Date: May 28, 2015

(87) PCT Pub. No.: WO2014/097587
PCT Pub. Date: Jun. 26, 2014

(65) Prior Publication Data
US 2015/0302820 A1 Oct. 22, 2015

(30) Foreign Application Priority Data

Dec. 19, 2012 (JP) ................................. 2012-277107
Oct. 25, 2013 (JP) ................................. 2013-222285

(51) Int. Cl.
*G06F 11/28* (2006.01)
*G09G 5/00* (2006.01)
(Continued)

(52) U.S. Cl.
CPC ........... *G09G 5/003* (2013.01); *G06F 3/1423* (2013.01); *G06F 9/4843* (2013.01); *G06F 9/541* (2013.01); *G06T 1/60* (2013.01); *G06F 2209/482* (2013.01)

(58) Field of Classification Search
CPC ................................. G06F 11/28; G06F 9/4843
(Continued)

(56) References Cited

U.S. PATENT DOCUMENTS

2001/0029550 A1* 10/2001 Endo ....................... G06F 9/544
719/319
2010/0107246 A1 4/2010 Ohta et al.
(Continued)

FOREIGN PATENT DOCUMENTS

JP H09-128277 A 5/1997
JP 2004-326562 A 11/2004
(Continued)

OTHER PUBLICATIONS

International Search Report and Written Opinion of the International Searching Authority dated Feb. 10, 2014 issued in the corresponding International application No. PCT/JP2013/007309 (and English translation).
(Continued)

Primary Examiner — Barry Drennan
Assistant Examiner — Shivang Patel
(74) Attorney, Agent, or Firm — Posz Law Group, PLC

(57) ABSTRACT

A vehicle display control device includes: a memory that stores a native platform for operating a native application and a versatile platform for operating a versatile application, and includes a common memory area for sharing data; a control unit that executes the versatile platform to operate a storing device for storing a versatile application image in the common memory area, executes the native platform to operate an acquisition device for acquiring the versatile application image, and operates a production device for producing a display image, in which the versatile application image and a native application image rendered by a native application are laid out; and a display control device that displays the display image on a display device.

17 Claims, 8 Drawing Sheets

(51) Int. Cl.
    *G06F 9/48* (2006.01)
    *G06F 3/14* (2006.01)
    *G06F 9/54* (2006.01)
    *G06T 1/60* (2006.01)

(58) Field of Classification Search
    USPC .......................................................... 345/520
    See application file for complete search history.

(56) References Cited

U.S. PATENT DOCUMENTS

| | | | |
|---|---|---|---|
| 2014/0115202 A1* | 4/2014 | Yoshinaga | G06F 13/426 710/62 |
| 2014/0120829 A1* | 5/2014 | Bhamidipati | H04N 21/42207 455/3.06 |
| 2014/0309806 A1* | 10/2014 | Ricci | B60Q 1/00 701/1 |

FOREIGN PATENT DOCUMENTS

| | | |
|---|---|---|
| JP | 2008-171076 A | 7/2008 |
| JP | 2010-049355 A | 3/2010 |
| JP | 2010-231601 A | 10/2010 |

OTHER PUBLICATIONS

"g-book.com" online, Toyota Media Service Corp., retrieved on Oct. 29, 2012, URL: http://g-book.com/pc/default.asp (discussed on p. 1 of the specification).

* cited by examiner

DISPLAY CONTROL DEVICE FOR VEHICLE TO GENERATE NATIVE DISPLAY IMAGES AND VERSATILE DISPLAY IMAGES

CROSS REFERENCE TO RELATED APPLICATION

This application is a U.S. national stage of International Application No. PCT/JP2013/007309 filed on Dec. 12, 2013 and is based on Japanese Patent Applications No. 2012-277107 filed on Dec. 19, 2012, and No. 2013-222285 filed on Oct. 25, 2013, the disclosures of which are incorporated herein by reference.

TECHNICAL FIELD

The present disclosure relates to a vehicle display control device that controls display and output to be performed by an application that runs in onboard equipment.

BACKGROUND ART

In the past, vehicular equipment (for example, a navigation unit or multifunctional display) that fetches a specific application from outside through wireless communication, and uses the application to provide information has been developed (refer to non-patent literature 1).

However, in the existing vehicular equipment, a dedicated application that meets running requirements of the vehicular equipment has to be independently developed in order to fetch an application from outside and run the application. For example, versatile applications compatible with versatile platforms including the Android (registered trademark) and iOS (registered trademark) have been developed for the sake of personal digital assistants including a smartphone and tablet PC. The versatile applications cannot be fetched into the vehicular equipment and run as they are.

By the way, a device that installs a versatile platform, which is compatible with versatile applications developed for personal digital assistants, in onboard equipment can be conceived so that a personal digital assistant such as a smartphone or tablet PC can be used to implement a popular feature in the vehicular equipment. The device is confronted with a problem to be described below because vehicular native applications that are implemented in advance as embedded features of the vehicular equipment and versatile applications fetched from outside coexist and run together.

Specifically, there is a possibility that a versatile application may behave incompatibly with a native application because the versatile application is not designed and produced based on the specifications for vehicular equipment. For example, there is a possibility that an output screen image produced by a native application may not be displayed because an output screen image produced by a versatile application fetched from outside is displayed at a timing at which the output screen image produced by the native application should be displayed on a display.

In order to avoid the foregoing incident, coordination is needed for fear display and output to be performed by a native application and display and output to be performed by a versatile application fetched from outside may contend with each other. Due to the situation, as for an existing vehicular equipment, a versatile application to be fetched from outside has to be provided with an independent mechanism that takes account of the running requirements of the vehicular equipment into which the versatile application is fetched. However, lots of development resources are needed in order to independently develop a versatile application that meets the requirements of the vehicular equipment. This becomes a factor of impeding prevalence of an application that is superb in information freshness and versatility.

PRIOR ART LITERATURES

Non Patent Literature

Non Patent Literature 1: "G-BOOK.com" ([online], Toyota Media Service Corp., retrieved on Oct. 29, 2012, Internet URL: http://g-book.com/pc/default.asp)

SUMMARY OF INVENTION

It is an object of the present disclosure to provide a vehicle display control device making it possible to concurrently or collaboratively display an output screen image produced by a native application and an output screen image produced by a versatile application in case a versatile platform is allowed to coexist and act in a vehicular embedded system.

According to an aspect of the present disclosure, a vehicle display control device includes: a memory that: stores a native platform as basic software for operating a native application, which is preliminary implemented as a vehicular embedded feature, and a versatile platform as basic software, which is virtually implemented in the native platform, for operating a versatile application introduced through information communication from an outside device; and includes a common memory area as a memory area for sharing data between the native platform and the versatile platform; a control unit that: executes the versatile platform so as to operate a storage device for storing a versatile application image, which is an image rendered by a running versatile application, in the common memory area; executes the native platform so as to operate an acquisition device for acquiring the versatile application image stored in the common memory area by the storage device; and operates a production device for producing a display image, in which the versatile application image acquired by the acquisition device and a native application image rendered by a running native application are laid out according to a predetermined display requirement defined in the native platform; and a display control device that displays the display image, which is produced by the production device, on a predetermined display device.

In the foregoing vehicle display control device, a display driver is not directly accessed from the versatile platform for the purpose of displaying an image outputted from a versatile application. Instead, using the mechanism of the common memory area, the native platform coordinates display of a versatile application image and display of a native application image so as to achieve display. More particularly, a display image (common memory area) prepared by the versatile platform is accessed from the native platform, and displayed on the pieces of actual display device by employing the mechanism for display of the native platform.

As mentioned above, owing to the common memory area serving as a contact window between the native platform and versatile platform, and a mechanism for transferring an image by way of the common memory area, whether a versatile application image can be displayed or a display position of the image can be controlled by the native platform. Accordingly, even if a versatile application introduced into the vehicle display control device has not been produced based on the specifications for onboard equipment, controlling display in conformity with the requirements of the onboard equipment can be realized. Therefore, when the versatile platform is allowed to coexist and act in a vehicular embedded system, concurrent display or collaborative display of an output screen image produced by a native application and an output screen image produced by a versatile application can be achieved.

According to an aspect of the present disclosure, a vehicle display control device includes: a native platform as basic software for operating a native application, which is preliminary implemented as a vehicular embedded feature; a versatile platform as basic software, which is virtually implemented in the native platform, for operating a versatile application introduced through information communication from an outside device; and a common memory area as a memory area for sharing data between the native platform and versatile platform. The versatile platform includes a storage device that stores a versatile application image, which is an image rendered by a running versatile application, in the common memory area. The native platform includes: an acquisition device that acquires the versatile application image stored in the common memory area by the storage device; a production device that produces a display image, in which the versatile application image acquired by the acquisition device, and a native application image rendered by a running native application are laid out according to a predetermined display requirement defined in the native platform; and a display control device that displays the display image, which is produced by the production device, on a predetermined display device.

In the vehicle display control device, owing to the common memory area serving as a contact window between the native platform and versatile platform, and a mechanism for transferring an image by way of the common memory area, whether a versatile application image can be displayed or the display position of the image can be controlled by the native platform. Accordingly, even if a versatile application introduced into the vehicle display control device has not been produced based on the specifications for onboard equipment, controlling display in conformity with the requirements of the onboard equipment can be realized. Therefore, when the versatile platform is allowed to coexist and act in a vehicular embedded system, concurrent display or collaborative display of an output screen image produced by a native application with an output screen image produced by a versatile application can be achieved.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

An embodiment of the present disclosure will be described in conjunction with the drawings. The present disclosure is not limited to the embodiment but can be implemented in various forms.

[Explanation of Configuration of Control Device 1]

Figure 1:
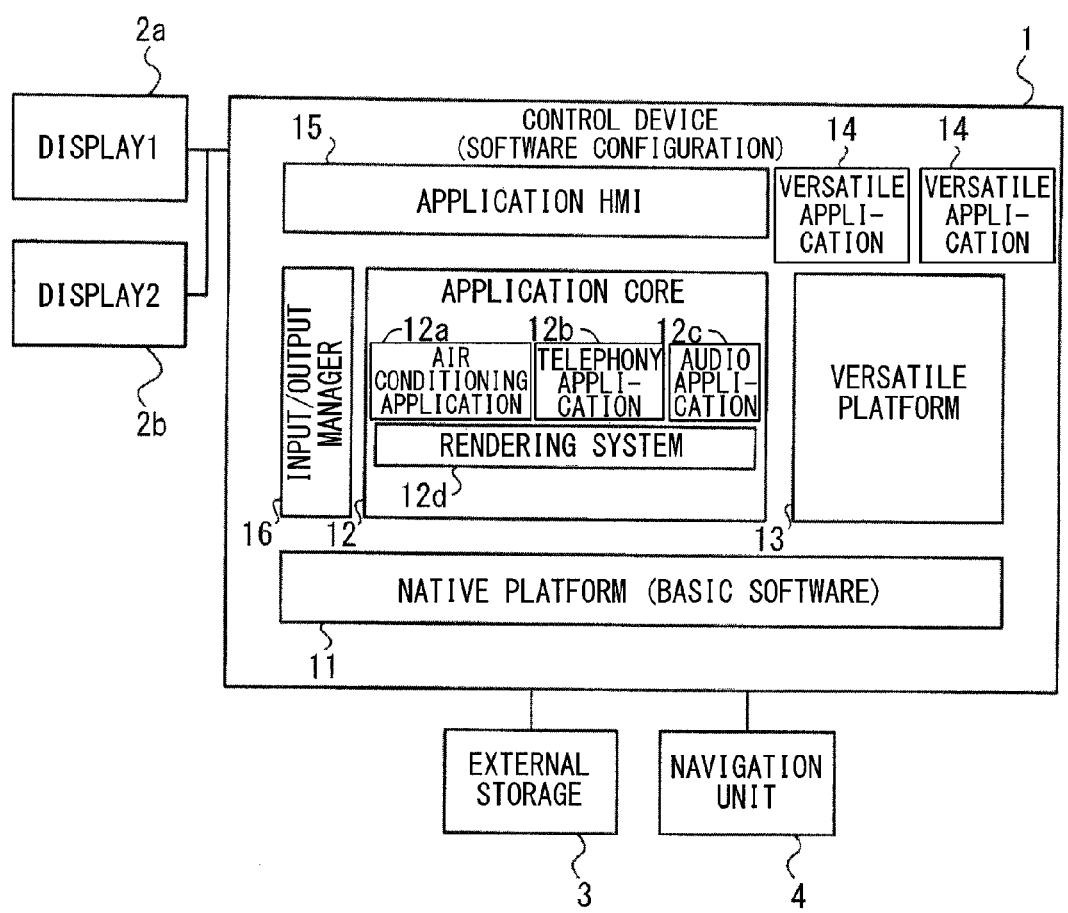
FIG. 1 is a block diagram showing a software configuration of a control device.

As shown in FIG. 1, a control device 1 is connected to two displays 2a and 2b, an external storage 3, and onboard equipment such as a navigation unit 4, and included in a vehicular display system. The control device 1 is a vehicle display control device that displays an image produced by a native application implemented in advance as a vehicular embedded feature, or a versatile application to be introduced through communication with outside. The control device 1 includes as software configuration, a native platform 11, an application core 12, a versatile platform 13, versatile applications 14, an application HMI 15, and an input/output manager 16.

The native platform 11 is basic software (may be referred to as an operating system (OS)) that provides features necessary for the basic operation of the control device 1. On the native platform 11, various native applications implemented in advance as vehicular embedded features are run as the application core 12. The native applications include, for example, an air conditioning application 12a, telephony application 12b, audio application 12c, and rendering system 12d. The native applications are a mere example, and any other vehicular software may be implemented as a native application.

The air conditioning application 12a is an application that displays a graphical user interface via which various maneuvers relevant to an automotive air conditioner are performed. The telephony application 12b is an application that provides a handsfree speech feature of a mobile phone to be employed inside a vehicle. The telephony application 12b displays an image, which is used to inform a driver of an incoming call, when a call originating from outside is terminated. The audio application 12c is an application that outputs various pictures or sounds on the basis of any of various picture/sound sources including a television set, video recorder, audio player, and radio. The rendering system 12d is an application that arbitrates display and output of images, which are outputted from various applications including the native applications and versatile applications, in conformity with the running requirements defined in the vehicular display system. In addition, a navigation feature to be executed in the navigation unit 4 is also a native application.

In the native platform 11, the versatile platform 13 is implemented. The versatile platform 13 is basic software (OS) on which the versatile applications 14, which are introduced from external server devices or the like through communication are run. The versatile platform 13 shall be implemented in the kernel of the native platform 11 using a known virtualization and implementation technology such as a technology that employs "chroot." Accordingly, the versatile platform 13 can run on the native platform 11 while being isolated. The control device 1 of the present embodiment shall have Android (registered trademark), which is widely prevailing as an open source operating system, implemented as the versatile platform 13.

Each of the versatile applications 14 is application software that runs dependently on the feature of the versatile platform 13. The versatile applications 14 are general-purpose applications that are not originally implemented in the control device 1 but are introduced from a group of servers, which constitute a cloud computing system centered on the Internet, through data communication at the discretion of a user. Owing to the versatile applications, when the cloud computing system or a high-performance portable terminal such as a smartphone is used to collaborate with the control device, pieces of information in a variety of fields or a user interface can be mutually exploited. Various versatile applications provide pieces of diverse image information that are not limited to information relevant to traveling of a vehicle.

The application HMI 15 is software that controls input and output devices such as a display and operating panel, and provides an application with an abstract interface. The input/output manager 16 is software that controls input or output of data between a peripheral device such as the displays 2a and 2b, external storage 3, or navigation unit 4 and the control device 1.

The displays 2a and 2b are color display devices that include a display surface such as a liquid crystal display panel, and shall be disposed within reach of a driver seat within a driver's visual field. The displays 2a and 2b can display mutually different images. Images based on display outputs produced by various applications to be run in the control device 1 are displayed on the displays 2a and 2b. The external storage 3 is a storage to be embodied with a hard disk drive or rewritable nonvolatile semiconductor memory. In the external storage 3, programs and data based on which the control device 1 operates are stored. The native platform, versatile platform, and the programs of the native applications and versatile applications are stored in the external storage.

The navigation unit 4 is a unit that guides a route and is designed for vehicles, and performs map display, route retrieval, and route guide. The map display is a feature that displays a map showing the vicinity of a current position or a mark or the like indicating the current position of a vehicle. The route retrieval is a feature that autonomously calculates an optimal route from the current position (departure point) to a destination. The route guide is a feature that guides traveling along a route obtained by the route retrieval. An output image produced by the navigation unit 4 is allocated to and displayed on either of the displays 2a and 2b after having display and output thereof arbitrated by the rendering system 12d of the control device 1.

Figure 2:
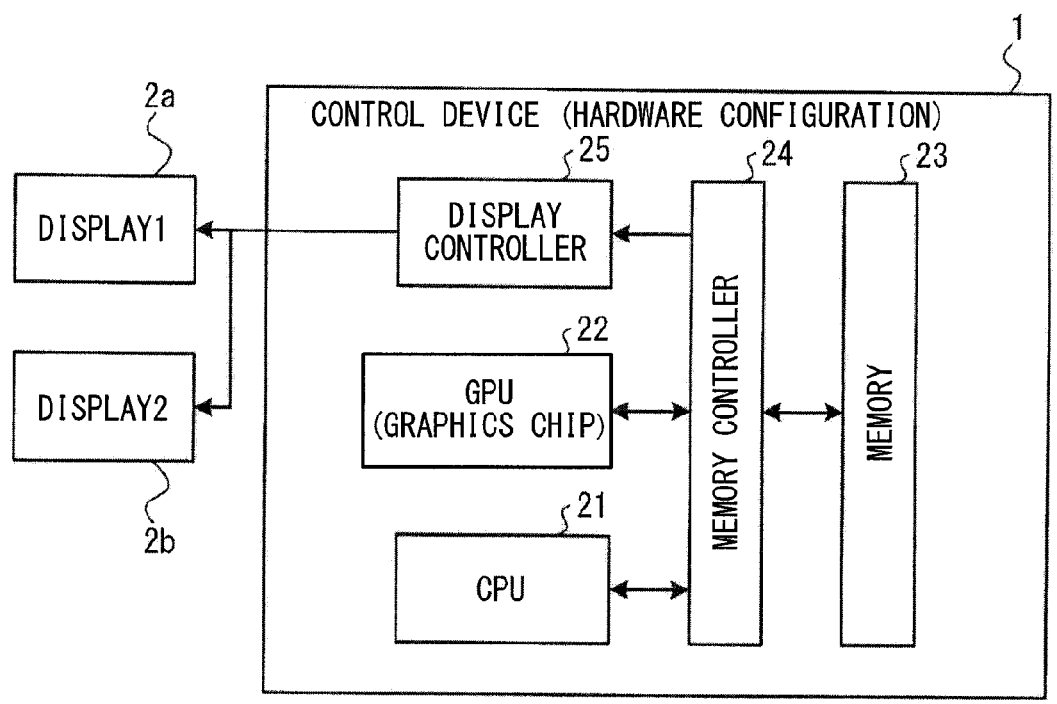
FIG. 2 is a block diagram showing a hardware configuration of the control device.

As shown in FIG. 2, the control device 1 includes as hardware configuration a CPU 21, GPU (graphics chip) 22, memory 23, memory controller 24, and display controller 25. The CPU 21 is an arithmetic processing unit that plays a pivotal role in the control device 1. The CPU 21 performs various numerical calculations or information processing according to programs, and realizes the features of the software components 11 to 16 of the control device 1.

The GPU 22 is an arithmetic processing unit that performs calculating processing necessary for display of an image in place of the CPU 21. The GPU 22 performs in place of the CPU 21 processing of rendering a concrete image according to data that represents the contents of the image, or processing of converting an output image produced by an application into an image structured in a predetermined format.

The memory 23 is a semiconductor memory (RAM) that can be directly accessed as a main memory by the CPU 21, GPU 22, or display controller 25 and is freely readable or writable. The memory controller 24 mediates reading or writing of data from or in the memory 23 to be performed by the CPU 21, GPU 22, or display controller 25. A display image produced based on images outputted from various applications to be run by the CPU 21 is written in a frame buffer included in a predetermined memory area of the memory 23. The display image written in the frame buffer is outputted to the displays 2a and 2b via the display controller 25, and displayed on the displays 2a and 2b.

[Explanation of Mechanism for Image Display]

Figure 3:
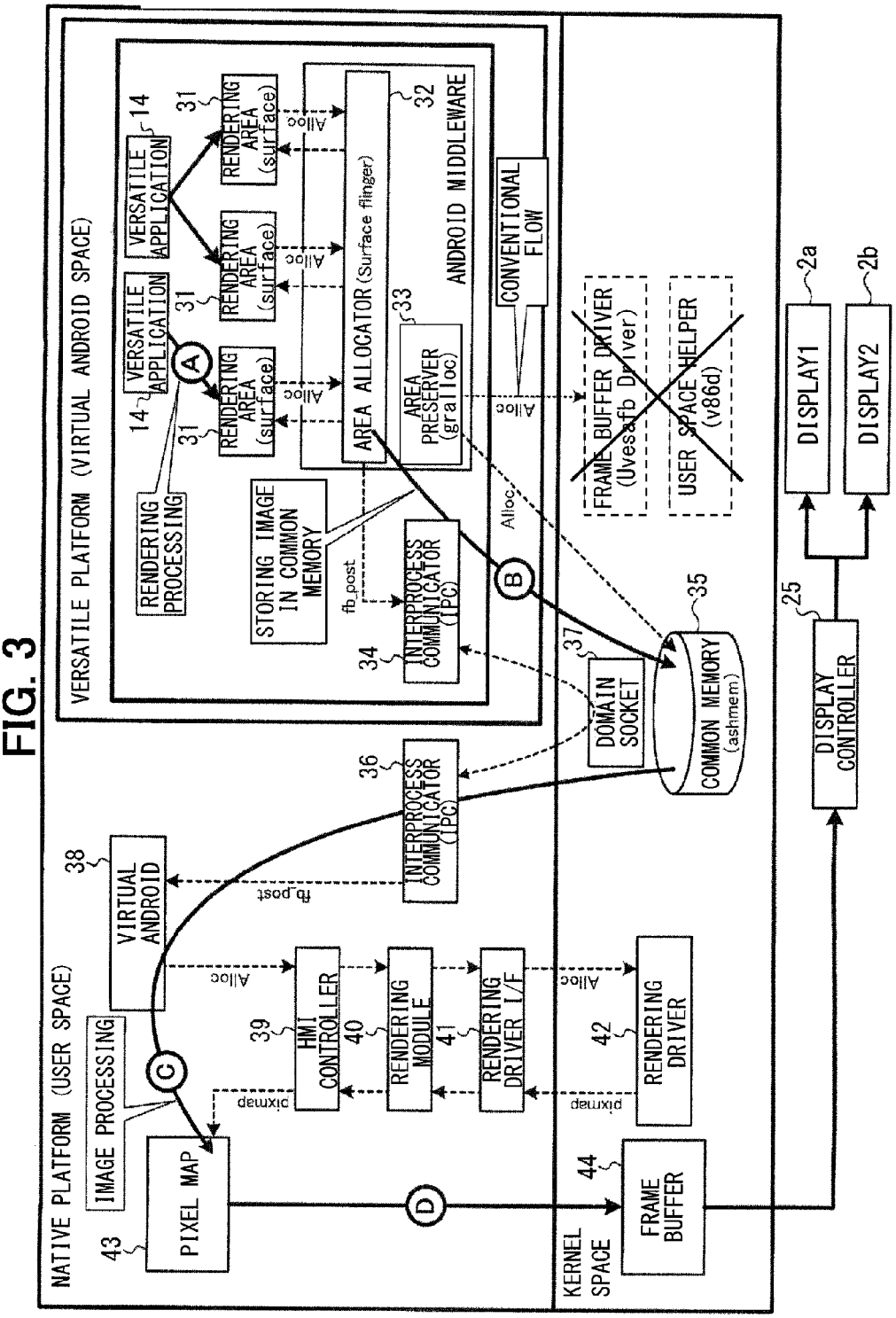
FIG. 3 is an explanatory diagram showing a mechanism for displaying an image.

Referring to FIG. 3, a description will be made of a mechanism and procedure which the control device 1 uses to display an image on the displays 2a and 2b on the basis of output images produced by a native application and versatile application respectively.

The native platform acts with a virtual address space separated into a user space and kernel space. The user space is a virtual memory area in which user processes of the application core and versatile platform run. The kernel space is a virtual memory area in which the kernel of the native platform resides.

The user space includes a virtual Android space in which the virtually implemented versatile platform (Android OS) acts. Interprocess communicators 34 and 36 that perform interprocess communication (IPC) such as socket communication are implemented in the native platform and versatile platform respectively. In the interprocess communication, a domain socket 37 of the native platform is used as an interface. In the kernel space, a common memory (ashmem) 35 that is a memory area in which data is shared between the native platform and versatile platform is implemented.

Each of the versatile applications 14 running in the virtual Android space preserves a rendering area 31 (surface), which is used to render an output image produced by the versatile application (hereinafter may be referred to as a versatile application image), via an area allocator 32 (surface flinger) included in Android middleware. The rendering area 31 allocated to each of the versatile applications 14 is preserved from the common memory 35 by an area preserver 33 included in the Android middleware. The versatile application 14 performs rendering processing of the versatile application image in the rendering area 31 allocated by the area allocator 32 (equivalent to a procedure indicated with an arrow A in FIG. 3). Results of rendering performed in the respective rendering areas 31 are subjected to synthesis processing by the area allocator 32, and stored in the common memory 35 (equivalent to a procedure indicated with an arrow B in FIG. 3).

A related art is different from the present disclosure, which adopts the common memory 35, in a point that the area allocator 33 preserves the rendering area, in which a versatile application image is rendered, from a frame buffer drive (uvesafb driver) included as a mechanism for the Android OS.

Writing a versatile application image in the common memory 35 is performed every time the versatile application image is updated by the versatile platform. The fact that the versatile application image in the common memory 35 has been updated is notified as an event "fb_post" from the versatile platform to a virtual Android 38 on the native platform via the interprocess communicators 34 and 36.

The virtual Android 38 is a module to be provided as a feature of the rendering system 12d that is a native application. The virtual Android 38 having received a notification fb_post acquires a versatile application image stored in the common memory 35. The virtual Android 38 stores the acquired versatile application image in a pixel map 43 preserved in the user space on the native platform (equivalent to a procedure indicated with an arrow C in FIG. 3).

At this time, if a supported pixel format is different between the versatile platform and native platform, the virtual Android 38 performs conversion processing of the pixel format and then stores a resultant image in the pixel map 43. For example, if a versatile application image outputted from the versatile platform is structured in format RGB565, the native platform performs image conversion of converting the versatile application image into an image structured in format ARGB8888 which the native platform supports. In addition, image conversion such as size adjustment of an image or color conversion is carried out if necessary.

The foregoing image conversion generally imposes a high processing load. When the CPU 21 is designed to perform image processing, sophisticated processing performance is requested. The common memory 35 may be used as a memory area that can be accessed by the GPU 22. In place of the CPU 21, the GPU 22 may perform image conversion on a versatile application image, which is stored in the common memory 35, using a predetermined graphical interface. Thus, reduction in a load on the CPU 21 and speed-up of display can be achieved.

A display image in which a versatile application image stored in the pixel map 43 and a native application image, which is outputted from a native application being run separately from the versatile application, are synthesized is produced, and stored in the frame buffer 44 in the kernel space (equivalent to a procedure indicated with an arrow D in FIG. 3). The display image stored in the frame buffer 44 is displayed on the displays 2a and 2b by the display controller 25. Herein, an HMI controller 39 determines according to predetermined display requirements, which are defined on the native platform, where the versatile application image and native application image are displayed, and lays out the display image. Rendering of the laid out display image is carried out by a rendering driver 42 in the kernel space via a rendering module 40 and rendering driver interface 41.

Figure 4:
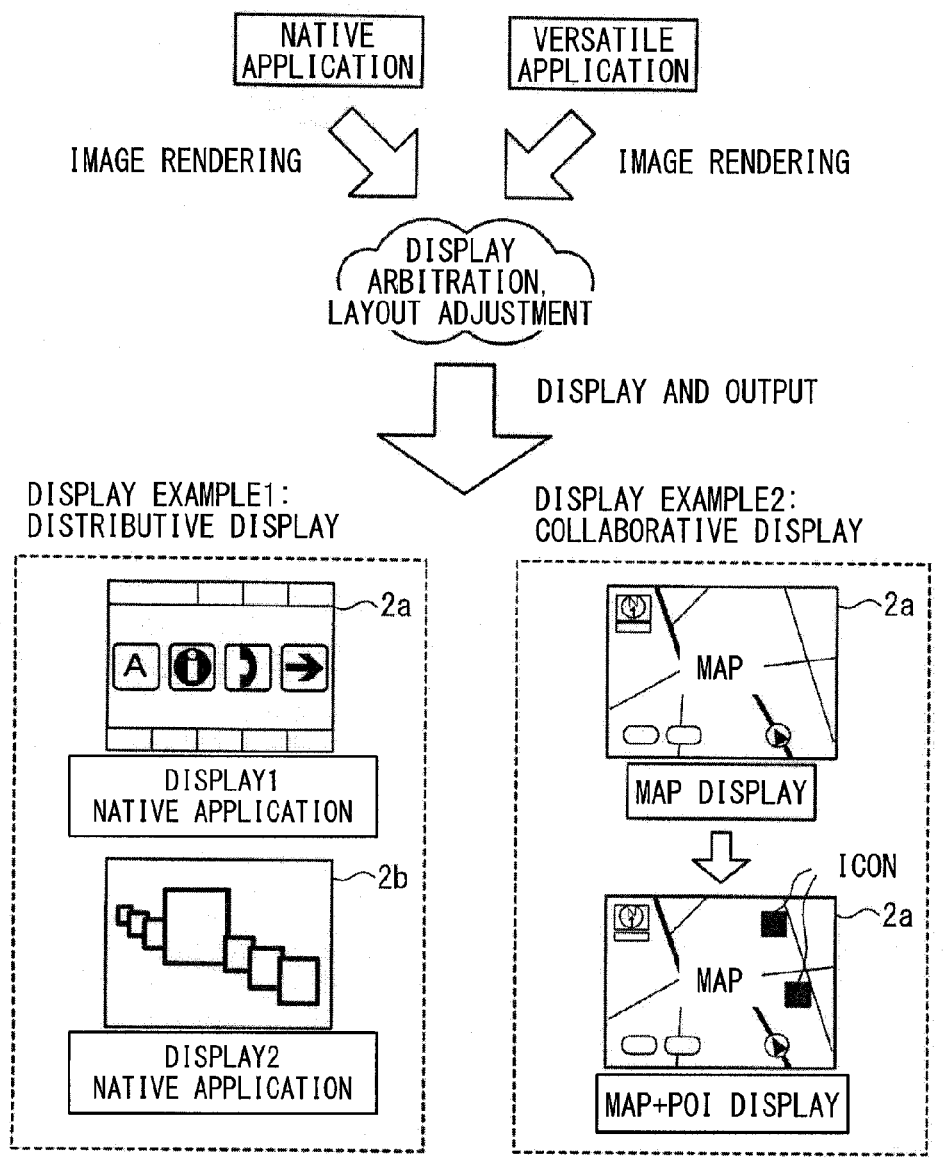
FIG. 4 is an explanatory diagram showing examples of image display.

As an example of a rule under which a display image is laid out, a method to be described below is cited. For example, a versatile application image and native application image are distributed according to the number of displays included in a vehicle, and laid out on different screens. Display example 1 in FIG. 4 shows a concrete example. In display example 1, an image produced by a native application is displayed on the display 2a out of the two displays 2a and 2b, and an image produced by a versatile application is displayed on the display 2b. Thus, the display places are coordinated by the native platform, whereby the image produced by the native application and the image produced by the versatile application can be concurrently displayed but either of the images is not exclusively displayed. Otherwise, a display area on one display may be segmented, and the versatile application image and native application image may be separately laid out in the segments.

In another example, a layout having output images of a native application and versatile application, which have a specific relationship, superposed on each other on one screen is created. For example, a versatile application image is conceivably superposed on a screen image, which is rendered and displayed by a native application, in order to supplementally display information. Display example 2 in FIG. 4 shows a concrete example. In display example 2, a native application that displays a map and a versatile application that provides point-of-interest (POI) information in the map collaborate with each other for display. Herein, icons representing POIs outputted from the versatile application are synthesized with a map image, which is outputted from the native application, while being aligned with specific positions in the map. Thus, the icons and map image are displayed on the one display 2a. A versatile application image to be displayed while being superposed on a native application image may be transparently synthesized with the native application image by applying a predetermined transparent color to the versatile application image, or multiplying each of pixels by an a value which represents a transparency.

In another example, a native application image and versatile application image are laid out according to priorities of display, which are defined in advance for respective applications, so that the native application image, which is given high priority and relates to traveling or safety of a vehicle, rather than any other versatile application image can be displayed by priority. In this case, the image given higher priority may be laid out on a main display, and the image given lower priority may be laid out on a sub-display, or the image given higher priority may be superposed on the other image.

Figure 5:
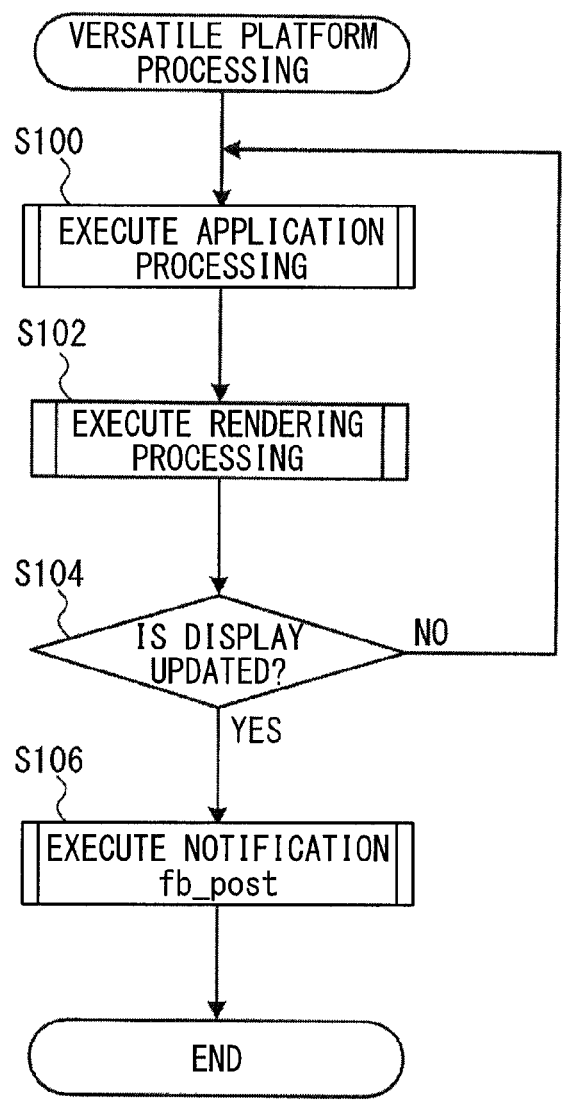
FIG. 5 is a flowchart describing processing to be performed by a versatile platform.

In the mechanism of a foregoing processing sequence, a procedure of processing to be performed by the versatile platform will be described with reference to the flowchart of FIG. 5. At S100, a versatile application being run on the versatile platform performs pieces of processing such as rendering of an image and display and output at respective timings. At S102, a versatile application image is rendered by the versatile application, and the rendered versatile application image is stored in the common memory 35 by the area allocator 32. At S104, the area allocator 32 decides whether display should be updated. Whether display should be updated is decided depending on whether a request for display of a new versatile application image is issued from the versatile application being run. If a decision is made that display is updated (S104: Yes), the processing proceeds to S106. If a decision is made that display is not updated (S104: No), the processing returns to S100. At S106, the area allocator 32 posts an event fb_post to the native platform via the interprocess communicator 34.

Figure 6:
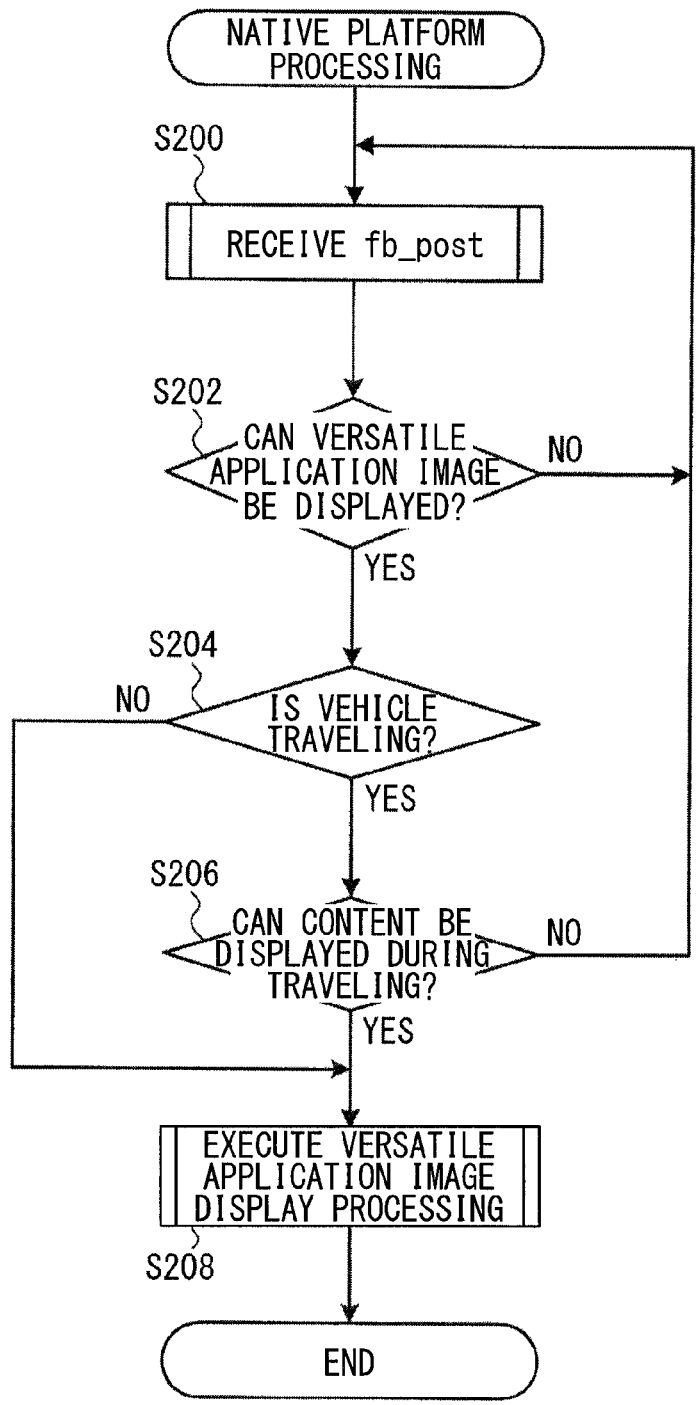
FIG. 6 is a flowchart describing processing to be performed by a native platform.

A procedure of processing to be performed by the native platform will be described with reference to the flowchart of FIG. 6. At S200, the virtual Android 38 receives a notification fb_post via the interprocess communicator 36. At S202 to which the processing proceeds on receipt of the notification fb_post, the vertical Android 38 decides whether a versatile application image identified with the received fb_post can be displayed. Herein, whether the versatile application image can be displayed is decided based on a predetermined rule relating to arbitration for display between a native application image and versatile application image. For example, in a situation in which a specific native application image given high priority and related to traveling or safety of a vehicle is displayed, a rule signifying that a versatile application image given low priority is not displayed is applied. If a decision is made that the versatile application image can be displayed (S202: Yes), the processing proceeds to S204. If a decision is made that the versatile application image cannot be displayed (S202: No), the processing returns to S200.

At S204, the virtual Android 38 decides whether an own vehicle is traveling. If a decision is made that the own vehicle is not traveling (S204: No), the processing proceeds to S208. If a decision is made that the own vehicle is traveling (S204: Yes), the processing proceeds to S206. At S206, the virtual Android 38 decides whether the versatile application image identified with the received fb_pst is a content that can be displayed during traveling. More particularly, the virtual Android 38 queries the versatile platform via the interprocess communicator 36 whether the content produced by the versatile application is suitable for display during traveling, and thus decides whether the versatile application image can be displayed. If a decision is made that the versatile application image identified with the received fb_post is a content that can be displayed during traveling (S206: Yes), the processing proceeds to S208. If a decision is made that the versatile application image identified with the received fb_post is a content which cannot be displayed during traveling (S206: No), the processing returns to S200.

At S208, display processing for displaying a versatile application image on a screen is carried out. Herein, as already described, the virtual Android 38 accesses the common memory 35 and acquires the versatile application image. The acquired versatile application image is laid out in a display image which is displayed on the displays 2a and 2b according to predetermined display requirements defined on the native platform, and the display image is rendered. The rendered display image is displayed on the displays 2a and 2b.

Supplemental Explanation on Embodiment

The control device 1 of the present embodiment has the different platforms (native platform and versatile platform) implemented in one system. The applications on the respective platforms can act mutually independently, and each of the applications can act without being interfered with application software installed on the other platform.

The versatile platform uses the same kernel as the native platform does. An application process or thread produced on the versatile platform has the surviving period or action timing thereof controlled by a process or thread management mechanism on the versatile platform. Preservation or release of a memory by the versatile platform or allocation of the memory to an application is controlled by a memory management mechanism included in the versatile platform. For example, as far as the Android OS or the like is concerned, the mechanisms are normally provided as Android middleware.

However, when the versatile platform acts independently, occupation of a CPU resource or memory resource is invited. There arises a possibility that the native platform may be adversely affected. In this case, a feature of the kernel that is used in common may be used to utilize a mechanism of imposing restrictions on the versatile platform. For example, the Linux (registered trademark) kernel normally includes a mechanism of isolating resources, such as, cgroup. When the mechanism is used to limit the action of the versatile platform, the action of an onboard feature that relates to safety of a vehicle and that is executed in the native platform can be guaranteed.

Versatile applications that run on the versatile platform act mutually independently, and perform rendering processing or display and output processing on an image at respective timings. The versatile applications do not run consciously of the behaviors of applications that run on the native platform.

The versatile platform does not perform display processing of displaying an image, which is rendered by a versatile application, on display devices (displays 2a and 2b). Instead, the versatile platform merely stores the image, which is rendered by the versatile application, in the common memory 35, and notifies an event (fb_post), which signifies that display has been updated, to the native platform.

Whether a versatile application image stored in the common memory 35 is actually displayed depends on the action of the native platform. The virtual Android 38 and other various features on the native platform exclusively control display between a versatile application image and native application image. For example, if the native platform decides that the versatile application image cannot be displayed, even if a versatile application displays and outputs the image, a picture stored in the common memory 35 is not transferred to the frame buffer 44. Thus, as for the versatile application image, the native platform can control whether the versatile application image can be displayed. If the versatile application image need not be displayed, the display of the image can be invalidated under the control of the native platform alone.

This prevents display of an image, which is produced by a native application and relates to an important feature relevant to traveling or safety of a vehicle, from being hindered by the action of the versatile platform. Even if a versatile application does not observe a regulation that limits display of an unnecessary image during traveling, the native platform suppresses display itself to be performed by the versatile platform. Thus, the display regulation to be imposed during traveling can be observed.

Even for an external image fetched from an application in an external unit (for example, the navigation unit 4) into the native platform, the native platform can control whether the external image can be displayed or can display the external image while superposing the external image on a native application image. In this case, by controlling whether a versatile application image can be displayed or by employing the same mechanism as the mechanism for superposing the versatile application image on the native application image for display, the native platform can control display of the external image.

Examples of Applications

Using the mechanisms of the common memory 35 and interprocess communicators 34 and 36, an external image which the native platform has fetched from an external unit such as the navigation unit 4 can be utilized by the versatile platform. Accordingly, the external image fetched by the native platform can be manipulated and displayed by a versatile application on the versatile platform or employed in image recognition or the like by a versatile application.

More particularly, an application programming interface (API) according to which access gained by the versatile platform is treated is defined on the native platform. In addition, software that responds to a request (API call) made by the versatile platform is implemented in the native platform. For example, for handing an external image, which the native platform has acquired from an external unit (navigation picture produced by the navigation unit 4), to the versatile platform, a sequence described below is followed. Namely, the versatile platform issues an API call, which signifies that the external image is acquired, to the native platform via the interprocess communicators 34 and 36. The native platform having received the API call stores the external image, which is acquired at that time, in the common memory 35. The native platform posts a response to the request to the versatile platform via the interprocess communicators 34 and 36. The versatile platform having received the response accesses the common memory 35 and acquires the external image. The external image acquired by the versatile platform is fed to a versatile application being run, and utilized in order to manipulate the external image or recognize an image by the versatile application.

Figure 7:
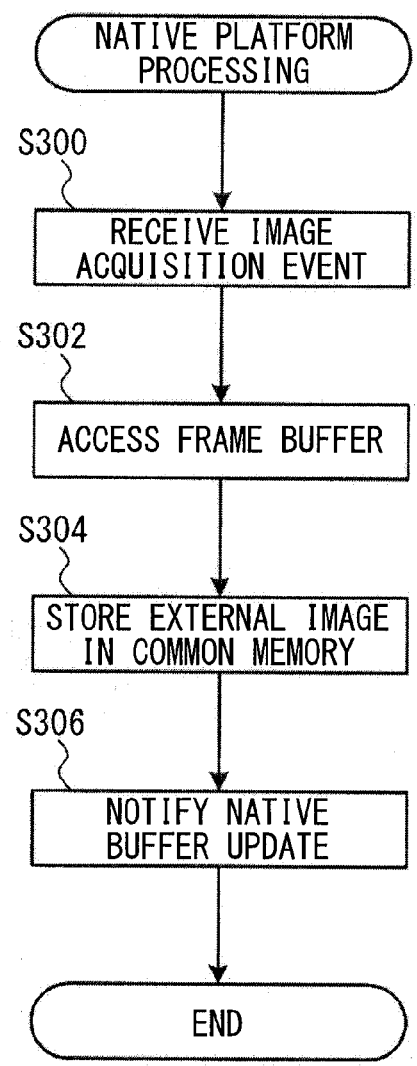
FIG. 7 is a flowchart describing processing to be performed by the native platform in an example of application.

In the foregoing processing sequence, a procedure of processing to be performed by the native platform will be described below by referring to the flowchart of FIG. 7. At S300, the native platform receives a notification of an event, which signifies that an external image is acquired, from the versatile platform via the interprocess communicator 36. At S302 to which the processing proceeds when the notification of the event signifying that the external image is acquired is received, the native platform accesses the frame buffer 44, and acquires the external image displayed and outputted by an application in an external unit. At S304, the native platform stores the external image, which is acquired at S302, in the common memory 35. At S306, the native platform notifies an event Native Buffer Update, which signifies that the external image has been stored in the common memory 35, to the versatile platform via the interprocess communicator 36.

Since the event is asynchronous, the action of the native platform can be continued without the necessity of waiting for a response from the versatile platform. The common memory 35 is provided with a buffer that has a capacity for a plurality of frames, and exclusive control is extended for fear while the native platform is storing an image in the common memory 35, the versatile platform may access the image.

Figure 8:
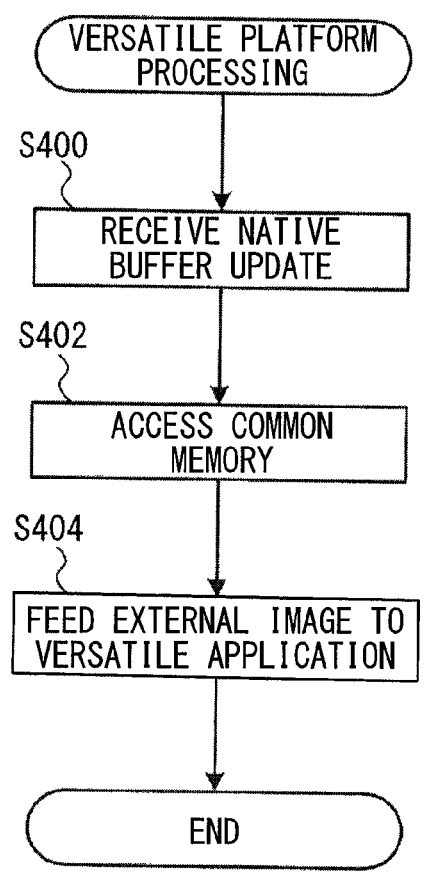
FIG. 8 is a flowchart describing processing to be performed by the versatile platform in the example of application.

Referring to the flowchart of FIG. 8, a procedure of processing to be performed by the versatile platform will be described below. At S400, the versatile platform receives a notification Native Buffer Update from the native platform via the interprocess communicator 34. At S402 to which the processing proceeds when the notification Native Buffer Update is received, the versatile platform accesses the common memory 35, and acquires an external image that is up-to-date at the time when the notification Native Buffer Update is received.

For example, if the action of the native platform is quicker than that of the versatile platform, a plurality of Native Buffer Update events are posted to the versatile platform. The versatile platform in turn does not hold and handle all the Native Buffer Update events, but acquires a latest image at a timing at which the versatile platform can act. Thus, a processing load can be reduced. At S404, the versatile platform feeds the external image, which is acquired from the common memory 35, to a versatile application that has requested acquisition of the external image.

Advantageous Effects

According to the control device 1 of the embodiment, advantageous effects described below are exerted.

Mechanisms serving as a contact window between the native platform and versatile platform, such as, the common memory 35, interprocess communicators 34 and 36, and virtual Android 38 are implemented in the control device 1. Accordingly, an output image of a versatile application can be displayed after being coordinated under a rule defined on the native platform. Thus, even when a versatile application introduced into the control device 1 is not produced based on the specifications for onboard equipment, display can be controlled in conformity with the requirements of the onboard equipment. Therefore, when the versatile platform is allowed to coexist and act in a vehicular embedded system, an output screen image produced by a native application and an output screen image produced by a versatile application can be concurrently displayed or collaboratively displayed.

Since a native application can perform predetermined image processing on a versatile application image stored in the common memory 35, the versatile application image can be converted into a format supported by the native platform and then displayed. Further, since the image processing is performed by the GPU 22 in place of the CPU 21, a processing load on the CPU 21 can be alleviated.

It is noted that a flowchart or the processing of the flowchart in the present application includes sections (also referred to as steps), each of which is represented, for instance, as S100. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

The invention claimed is:

1. A vehicle display control device comprising:
 a memory that:
  stores a native platform and a versatile platform,
   wherein the native platform is stored in the memory as basic software for operating a native application,
   wherein the native application is preliminary implemented as a vehicular embedded feature,
   wherein the versatile platform is stored in the memory as basic software, wherein the versatile platform is virtually implemented in the native platform, wherein the versatile platform operates a versatile application,
   wherein the versatile application is introduced into the vehicle display control device through information communication from an outside device and the versatile application that is introduced into the vehicle display control device thereafter runs in the vehicle display control device; and
  includes a common memory area as a memory area for sharing data between the native platform and the versatile platform;
 a processor, the processor is configured to:
  execute the versatile platform so as to operate a storage device for storing a versatile application image, which is an image rendered by a running versatile application, in the common memory area;
  execute the native platform so as to operate an acquisition device for acquiring the versatile application image stored in the common memory area by the storage device; and
  operate a production device for producing a display image, in which the versatile application image acquired by the acquisition device and a native application image rendered by a running native application are laid out according to a predetermined display requirement defined in the native platform;

control a display control device that displays the display image, which is produced by the production device, on a predetermined display device, wherein the processor is further configured to operate the production device to produce a display image related to the versatile application image acquired by the acquisition device, and a display image related to the native application image rendered by the running native application as display images, which are displayed separately on a plurality of display screens, the processor is further configured to control the display control device to display the display image related to the versatile application image produced by the production device and the display image related to the native application image, by separately distributing the display images to a plurality of display screens, respectively, and the processor is further configured so that the native application and the versatile application coexist in the vehicle display control device and run together in the vehicle display control device, wherein the processor is further configured to execute the versatile platform not to directly access the display control device to display the versatile application image; and wherein the processor is further configured to execute the native platform to coordinate the versatile application image and the native application image by accessing the versatile application image in the common memory area.

2. The vehicle display control device according to claim 1, wherein the processor is further configured to operate the communication device for communicating between the native platform and the versatile platform, execute the versatile platform to notify information that the storage device has stored the versatile application image in the common memory area to the native platform via the communication device, and execute the native platform so as to control the acquisition device to acquire the versatile application image, which is stored in the common memory area, under a condition that the information that the versatile application image has been store in the common memory area is notified to the native platform via the communication device.

3. The vehicle display control device according to claim 1, wherein the processor is further configured to execute the versatile platform so as to further operate a conversion device for converting the versatile application image into an image in a predetermined format, and wherein the production device produces a display image, in which the image, prepared by converting the versatile application image with the conversion device to have the predetermined format, and the native application image are laid out according to the display requirement.

4. The vehicle display control device according to claim 3, wherein the processor includes a central processing unit and an image processing unit, wherein the central processing unit operates the native platform, wherein the image processing unit performs a calculation, which is necessary to display an image, in place of the central processing unit, and wherein the conversion device controls the image processing unit to convert the versatile application image.

5. The vehicle display control device according to claim 1, wherein the production device produces a display image, in which the versatile application image acquired by the acquisition device and the native application image rendered by the native application are displayed and superposed on each other.

6. The vehicle display control device according to claim 1, wherein the processor is further configured to operate a communication device for communicating between the native platform and versatile platform, execute the native platform so as to (i) store an external image, which is rendered by an application in an external unit connected to the vehicle display device, in the common memory area, and to (ii) notify information that the external image has been stored in the common memory area to the versatile platform via the communication device, and execute the versatile platform so as to (i) acquire the external image, which is stored in the common memory area, under a condition that the information that the external image has been stored in the common memory area is notified to the versatile platform via the communication device, and to (ii) feed an acquired external image to a running versatile application.

7. A vehicle display control device comprising:

a processor, the processor is configured to execute a native platform as basic software for operating a native application, wherein the native application is preliminary implemented as a vehicular embedded feature;

execute a versatile platform as basic software, wherein the versatile platform is virtually implemented in the native platform, wherein the versatile platform operates a versatile application, wherein the versatile application is introduced into the vehicle display control device through information communication from an outside device and the versatile application that is introduced into the vehicle display control device thereafter runs in the vehicle display control device; and a common memory area as a memory area for sharing data between the native platform and versatile platform, wherein the versatile platform includes a storage device that stores a versatile application image, which is an image rendered by a running versatile application, in the common memory area, and wherein the native platform includes:

an acquisition device that acquires the versatile application image stored in the common memory area by the storage device;

a production device that produces a display image, in which the versatile application image acquired by the acquisition device, and a native application image rendered by a running native application are laid out according to a predetermined display requirement defined in the native platform; and a display control device that displays the display image, which is produced by the production device, on a predetermined display device, wherein the processor is further configured to operate the production device to produce a display image related to the versatile application image acquired by the acquisition device, and a display image related to the native application image rendered by the running native application as display images, which are displayed separately on a plurality of display screens, control the display control device to display the display image related to the versatile application image produced by the production device and the display image related to the native application image, by separately distributing the display images to a plurality of display screens, respectively, and the processor is further configured so that the native application and the versatile application coexist in the vehicle display control device and run together in the vehicle display control device, wherein the processor is further configured to execute the versatile platform not to directly access the display control device to display the versatile application image; and wherein the processor is further configured to execute the native platform to coordinate the versatile application image and the native application image by accessing the versatile application image in the common memory area.

8. The vehicle display control device according to claim 1, wherein the basic software of the native platform includes a rendering driver, wherein the processor is further configured to arbitrate, in the rendering driver of the native platform, in conformity with running requirements defined by the native application that was preliminary implemented as the vehicular embedded feature, display and output of images which are outputted from both (a) the native application of the vehicular embedded feature, and (b) the versatile application that runs on the versatile platform virtually implemented in the native platform.

9. The vehicle display control device according to claim 1, wherein the processor is further configured to determine, by the native platform, whether the versatile application image can be displayed based on a predetermined rule which relates to arbitration for display between the native application image and the versatile application image.

10. The vehicle display control device according to claim 1, wherein the processor is further configured to determine, by the native platform, whether the versatile application image can be displayed based on a predetermined rule which relates to whether the vehicle is traveling and arbitration that prioritizes display of the native application image over the versatile application image while the vehicle is traveling.

11. The vehicle display control device according to claim 7, wherein the basic software of the native platform includes a rendering driver, wherein the processor is further configured to arbitrate, in the rendering driver of the native platform, in conformity with running requirements defined by the native application that was preliminary implemented as the vehicular embedded feature, display and output of images which are outputted from both (a) the native application of the vehicular embedded feature, and (b) the versatile application that runs on the versatile platform virtually implemented in the native platform.

12. The vehicle display control device according to claim 7, wherein the processor is further configured to determine, by the native platform, whether the versatile application image can be displayed based on a predetermined rule which relates to arbitration for display between the native application image and the versatile application image.

13. The vehicle display control device according to claim 7, wherein the processor is further configured to determine, by the native platform, whether the versatile application image can be displayed based on a predetermined rule which relates to whether the vehicle is traveling and arbitration that prioritizes display of the native application image over the versatile application image while the vehicle is traveling.

14. The vehicle display control device according to claim 1, wherein the processor is further configured to execute the native platform to access the versatile application image in the common memory area, which is prepared by the versatile platform, and to cause the native platform to coordinate a concurrent display of the versatile application image and the native application image by employing a mechanism of the native platform.

15. The vehicle display control device according to claim 7, wherein the processor is further configured to execute the native platform to access the versatile application image in the common memory area, which is prepared by the versatile platform, and to cause the native platform to coordinate a concurrent display of the versatile application image and the native application image by employing a mechanism of the native platform.

16. The vehicle display control device according to claim 1, wherein the versatile application includes a versatile frame buffer driver that renders images into a versatile frame buffer from which images are displayed by the versatile application, wherein the native platform includes a rendering driver that renders images into a native frame buffer from which images are displayed by the native platform, the native platform exclusively controls the native frame buffer, wherein the versatile application, which runs in the vehicle display control device, is further configured to allocate a rendering area from the common memory area, and perform rendering processing of the versatile application image into the rendering area which is in the common memory area, instead of rendering the versatile application image into the versatile frame buffer by the versatile frame buffer driver of the versatile platform, wherein the native platform is further configured to determine whether to display the versatile application image, which has been rendered for display by the versatile application into the rendering area allocated from the common memory area, when the versatile application is determined to be displayed, the rendering driver of the native platform renders at least the versatile application image, which stored in the common memory, into the native frame buffer of the native platform, and the native platform outputs at least the versatile application image from the frame buffer of the native platform, when the versatile application is determined to not be displayed, the native platform does not render the versatile application image, which is stored in the common memory to a frame buffer of the native platform, and the native platform invalidates display of the versatile application image.

17. The vehicle display control device according to claim 7, wherein the versatile application includes a versatile frame buffer driver that renders images into a versatile frame buffer from which images are displayed by the versatile application, wherein the native platform includes a rendering driver that renders images into a native frame buffer from which images are displayed by the native platform, the native platform exclusively controls the native frame buffer, wherein the versatile application, which runs in the vehicle display control device, is further configured to allocate a rendering area from the common memory area, and perform rendering processing of the versatile application image into the rendering area which is in the common memory area, instead of rendering the versatile application image into the versatile frame buffer by the versatile frame buffer driver of the versatile platform, wherein the native platform is further configured to determine whether to display the versatile application image, which has been rendered for display by the versatile application into the rendering area allocated from the common memory area, when the versatile application is determined to be displayed, the rendering driver of the native platform renders at least the versatile application image, which stored in the common memory, into the native frame buffer of the native platform, and the native platform outputs at least the versatile application image from the frame buffer of the native platform, when the versatile application is determined to not be displayed, the native platform does not render the versatile application image, which is stored in the common memory to a frame buffer of the native platform, and the native platform invalidates display of the versatile application image.

* * * * *